United States Patent [19]
Karbach et al.

[11] Patent Number: 5,803,162
[45] Date of Patent: Sep. 8, 1998

[54] HEAT EXCHANGER FOR MOTOR VEHICLE COOLING EXHAUST GAS HEAT EXCHANGER WITH DISK-SHAPED ELEMENTS

[75] Inventors: Thomas Karbach, Stuttgart; Conrad Pfender, Besigheim; Eberhard Zwittig, Hochdorf, all of Germany

[73] Assignee: Behr GmbH & Co., Germany

[21] Appl. No.: 869,226

[22] Filed: Jun. 4, 1997

Related U.S. Application Data

[63] Continuation of Ser. No. 425,091, Apr. 14, 1995, abandoned.

[30] Foreign Application Priority Data

Apr. 14, 1994 [DE] Germany ............... 94 06 197 U

[51] Int. Cl.⁶ ................................................. F28F 13/12
[52] U.S. Cl. ................ 165/109.1; 165/153; 165/166; 165/170
[58] Field of Search ............ 165/109.1, 151–153, 165/167, 170, 177, 176, 183, 179

[56] References Cited

U.S. PATENT DOCUMENTS

| | | | |
|---|---|---|---|
| 2,488,615 | 11/1949 | Arnold | 165/109.1 X |
| 2,852,042 | 9/1958 | Lynn | 165/109.1 X |
| 3,363,682 | 1/1968 | Hartley. | |
| 4,262,659 | 4/1981 | Brzezinski | 165/170 X |
| 4,729,428 | 3/1988 | Yasutake et al. | 165/166 |
| 4,945,981 | 8/1990 | Joshi | 165/109.1 |
| 4,967,835 | 11/1990 | Lefeber | 165/167 |
| 5,040,596 | 8/1991 | Terasaki et al. | 165/166 |
| 5,052,889 | 10/1991 | Abdel-Messeh | 165/170 X |
| 5,275,237 | 1/1994 | Rolfson et al. | 165/168 X |

FOREIGN PATENT DOCUMENTS

| | | | |
|---|---|---|---|
| 0 234 942 A1 | 9/1987 | European Pat. Off. . | |
| 2326468 | 12/1974 | Germany | 165/179 |
| 29 24 441 | 12/1979 | Germany . | |
| 30 17 701 | 1/1981 | Germany . | |
| 32 15 961 | 11/1983 | Germany . | |
| 36 08 232 | 9/1987 | Germany . | |
| 37 39 619 | 4/1988 | Germany . | |
| 88 16 155.2 | 3/1989 | Germany . | |
| 39 36 800 A1 | 5/1991 | Germany . | |
| 107097 | 4/1989 | Japan | 165/916 |
| 198692 | 7/1992 | Japan | 165/177 |
| 283399 | 10/1992 | Japan | 165/916 |
| 512365 | 6/1976 | U.S.S.R. | 165/179 |
| 556766 | 10/1943 | United Kingdom | 165/179 |

*Primary Examiner*—Leonard R. Leo
*Attorney, Agent, or Firm*—Evenson, McKeown, Edwards & Lenahan, P.L.L.C.

[57] ABSTRACT

A heat exchanger for cooling exhaust gas of a motor vehicle with a closed flow guiding system for the exhaust gas has heat exchange elements which are arranged between a feeding device and a removing device for the exhaust gas and around which a cooling medium flows. Heat exchange elements are disk-shaped and are each joined together from two metal sheets. At least one turbulence insert 20 is arranged between the sheets and comprises projections which extend diagonally with respect to the flow direction and project upwards from a surface.

15 Claims, 5 Drawing Sheets

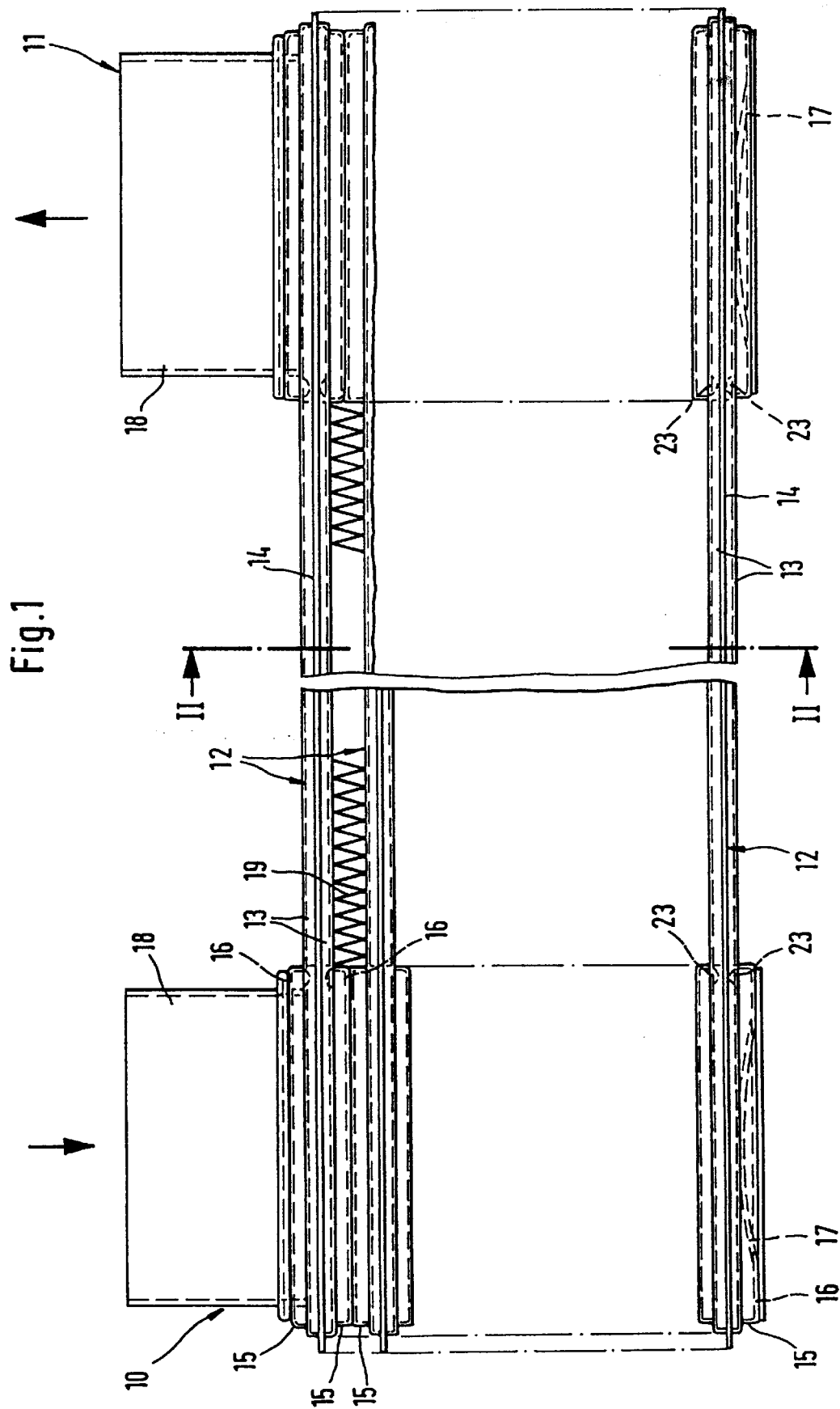

HEAT EXCHANGER FOR MOTOR VEHICLE COOLING EXHAUST GAS HEAT EXCHANGER WITH DISK-SHAPED ELEMENTS

This application is a continuation of application Ser. No. 08/425,091, filed on Apr. 14, 1995, now abandoned.

BACKGROUND AND SUMMARY OF THE INVENTION

The present invention relates to a heat exchanger for cooling exhaust gas of a motor vehicle engine with a closed flow guiding system for the exhaust gas comprising heat exchange elements which are arranged between a feeding device and a removing device for the exhaust gas and around which a cooling medium flows.

Heat exchangers with disk-shaped heat exchange elements are known for use as oil coolers as seen in German Patents DE 29 24 441 A and DE 36 08 232 A1. The flow of the oil flowing inside the disk-shaped heat exchange elements is influenced by the sheet metal shells of the disk-shaped heat exchange elements being provided with rib-type depressions.

German Patent DE 37 39 619 A1 describes a heat exchanger provided with projections, which are directed diagonally with respect to the flow direction and project upwards from a surface, on ribs. These projections generate so-called "cone swirls". In this case, it is also known to arrange the projections in pairs, the two projections of one pair diverging in the flow direction.

It is an object of the present invention to provide a heat exchanger of compact construction which is insensitive to a clogging by dirt particles carried along by the exhaust gas.

This object has been achieved in accordance with the present invention by providing disk-shaped heat exchange elements each joined together from two metal sheets between which is arranged at least one turbulence insert having projections extending diagonally to the flow direction and projecting upwardly from a surface.

The disk-shaped heat exchange elements of the present invention allow a compact construction. The turbulence insert of the disk-shaped heat exchange elements provides that an effective heat exchange is obtained. The projections provide that boundary layers are constantly broken up, in which case longitudinal swirls are generated which constantly mix the exhaust gas. As a result, a relatively low susceptibility to dirt is achieved because the flow cross-section is not significantly reduced. Even in the case of a partial contamination, the pressure drop of the exhaust gas remains almost constant.

In another aspect of the present invention, a metal sheet is provided as a turbulence insert which is bent in an approximately meandering shape transversely to the flow direction and which divides the disk-shaped heat exchange element into several ducts extending in the flow direction. In further development, the projections, in each case, project upwards from a surface resting against the sheet metal shell. As a result, the pressure loss in the disk-shaped heat exchange elements is limited to a minimum. The projections can, however, also be provided alternately on the top and on the bottom in the duct.

In a further embodiment of the present invention, corrugated ribs or solid ribs are arranged between the adjacent disk-shaped heat exchange elements. In order to improve the heat exchange also in this instance, the corrugated ribs or solid ribs are provided with upright projections which are aligned diagonally with respect to the flow direction.

In a yet further embodiment of the present invention, the disk-shaped heat exchange elements each have two parallel metal sheets whose edges are spaced by shoulders and receive one turbulence insert respectively between one another. In a further variation of this embodiment, one plate respectively is arranged between the disk-shaped heat exchange elements and is provided with strip-shaped recesses which extend essentially in parallel to one another and, together with the metal sheets of the heat exchange elements, form guide ducts for a liquid cooling medium. This type of a heat exchanger can be constructed to be significantly more compact than a heat exchanger cooled by air. The metal sheets may be provided with naps so that, when the metal sheets are assembled, a duct is formed whose height is determined by the naps which also improve the heat transfer.

BRIEF DESCRIPTION OF THE DRAWINGS

These and other objects, features and advantages of the present invention will become more readily apparent from the following detailed description thereof when taken in conjunction with the accompanying drawings wherein:

FIG. 1 is a view of a heat exchanger according to the present invention viewed in an approach flow direction of air approaching the heat exchanger;

DETAILED DESCRIPTION OF THE DRAWINGS

Figure 1A:
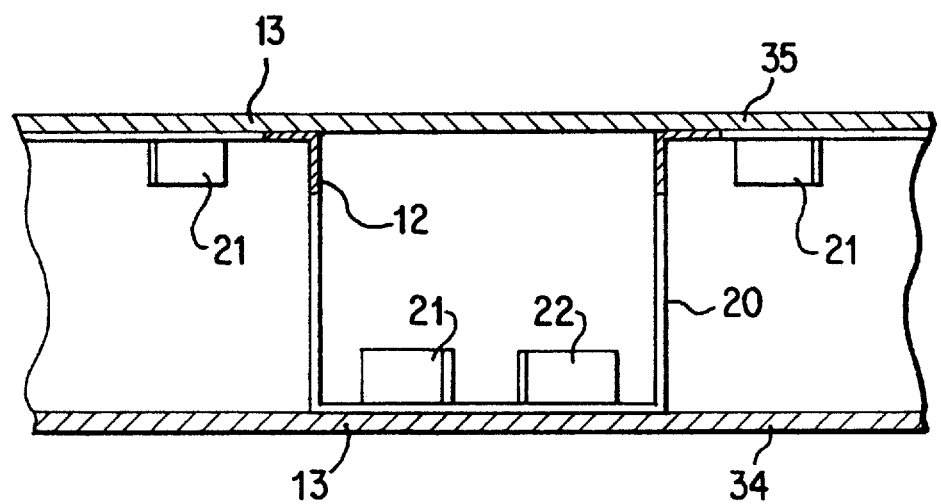
FIG. 1a is an isolated sectional view of a cutout of the heat exchanger shown in FIG. 1 and also of the type shown in FIG. 5.
Figure 2:
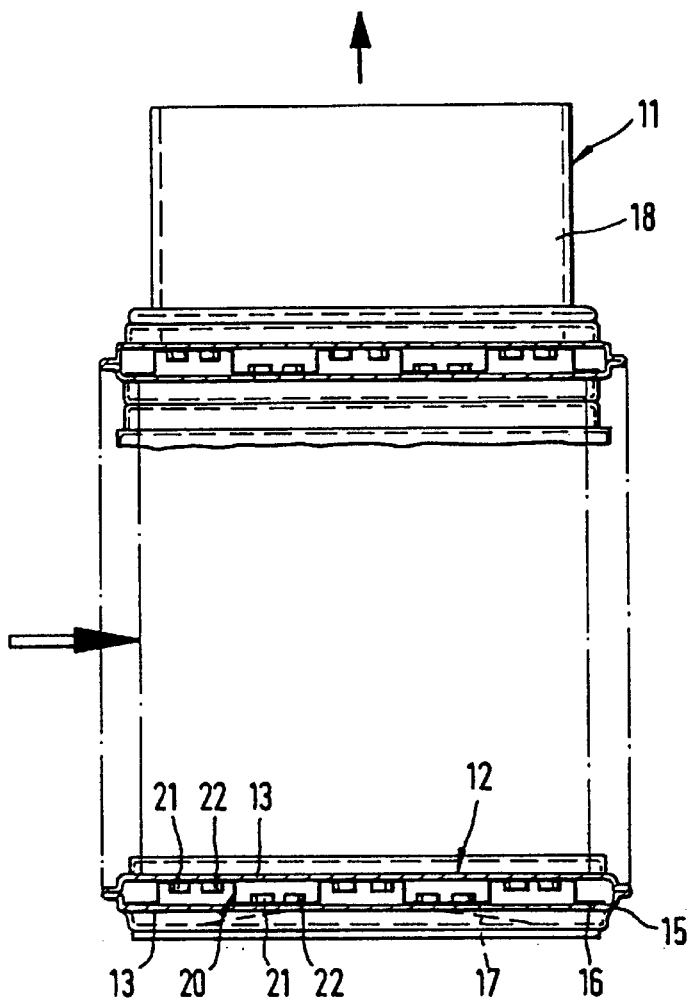
FIG. 2 is a sectional view along line II—II of FIG. 1.
Figure 3:
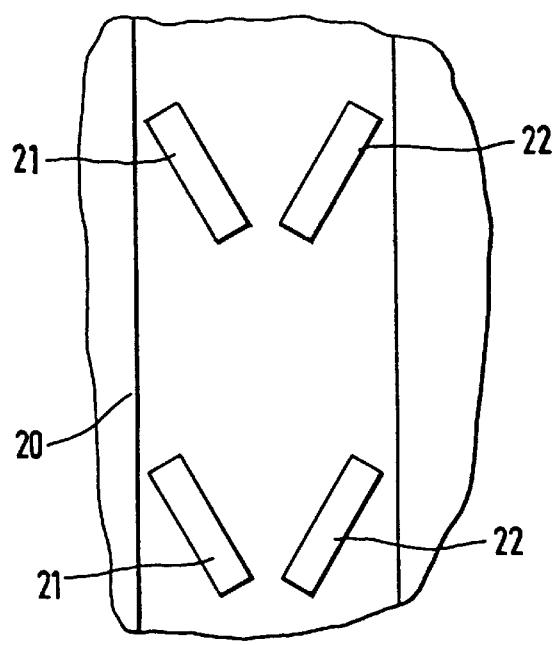
FIG. 3 is an enlarged top view of a detail of a turbulence insert of a disk-shaped heat exchange element of the heat exchanger according to FIGS. 1 and 2.

The heat exchanger illustrated in FIGS. 1 to 3 is used for cooling a hot exhaust gas of the internal-combustion engine of a motor vehicle by way of ambient air, particularly an air stream, which flows around the heat exchanger. The exhaust gas is guided between a feeding device 10 and a removing device 11 in a closed flow guiding system.

The closed flow guiding system has a plurality of disk-shaped heat exchange elements 12 which are layered in a stack-like manner. The disk-shaped heat exchange elements 12 each have two stamped sheet metal shells 13 which are joined in a mirror-inverted fashion and each form a guide for the exhaust gas. Each of the sheet metal shells 13, which have an essentially U-shaped profile, have a surrounding edge flange 14 on which they are connected with one another.

In their end areas, the sheet metal shells 13 are provided with pot-type indentations 15 whose bottom area is recessed with the exception of a surrounding edge web 16. By way of these surrounding edge webs 16, the pot-type indentations 15 rest against one another. As a result, in the area of the feeding device 10, a feeding duct is formed to the individual heat exchange elements and, in the area of the removing device 11, a removing duct is formed.

The outermost sheet metal shell 13, which faces away from the feeding device and the removing device, is closed in the area of the indentations 15 by curved covers 17 which rest against the edge webs 16. A connecting sleeve 18 is joined to the respective first shell 13 on the side of the feeding device 10 and of the removing device 11.

Because of the pot-shaped indentations 15, the heat exchange elements 12 are spaced from one another. In this area, a corrugated rib 19 is entered between the heat exchange elements 12.

In the center area of the disk-shaped heat exchange elements 12, a turbulence insert 20 is arranged on the inside as seen in FIG. 2. The insert 20 is formed of a metal sheet which is curved in a meandering manner and which divides the heat exchange elements in each case into approximately rectangular ducts which extend in the flow direction of the exhaust gas. The turbulence insert 20 is provided in each case on the surfaces resting against a sheet metal shell 13 with projections 21, 22 which project upwards in pairs and whose height extends approximately along half the height of the individual ducts.

The projections 21, 22, which project upwards in pairs, are set diagonally with respect to the flow direction at an angle of approximately 15° to 40°. Each of these projections 21, 22 generates a cone-type longitudinal swirl by which the boundary layers are broken up so that a good mixing of the exhaust gas is obtained without the occurrence of an excessive pressure loss. The two projections 21, 22, which have a rectangular or triangular or trapezoid shape and which approach up to an area of approximately 1.2 mm, will then diverge in a diffusor-type manner.

In the illustrated embodiment, the projections 21, 22, whose height corresponds to approximately 0.2 times to approximately 0.6 times the duct height and whose length corresponds to approximately twice the duct height, are arranged mirror-symmetrically with respect to the flow direction. In a modified embodiment thereof, the projections 21, 22 are arranged to be offset with respect to one another in the flow direction. The turbulence inserts 20 extend only along the center area of the disk-shaped heat exchange elements 12. Their position is fixed by inwardly directed depressions 23 of the sheet metal shells.

The sheet metal shells 13, the covers 17 and the connecting sleeves 18 are constructed of a stainless special steel. The corrugated ribs 19 are made of the same material. Likewise, the turbulence inserts 20 can be made of the same material, but it is also possible to use a different material for them without departing from the scope of the present invention. After the packing, the joined heat exchanger will be hard-soldered.

In a modified embodiment, the corrugated ribs 19 are also provided with projections which are arranged similarly to the projections 21, 22 of the turbulence inserts. These projections of the corrugated ribs 19 can also have a triangular surface. In a still further modified embodiment, instead of corrugated ribs 19, "solid" ribs are provided which are rectangularly tilted in a manner which is similar to the turbulence inserts. Like the turbulence inserts, these solid ribs are then provided with upward projections in their surfaces which each rest on the sheet metal shells 13 of the heat exchange elements 12 and have the shape of the projections 21, 22.

In the illustrated embodiment, air is used as the cooling medium which flows on the outside around the heat exchange elements 12. In a modified embodiment, however, a cooling liquid, particularly water with an antifreeze, is provided as the cooling medium, in which case, the stack consisting of the heat exchange elements is surrounded by a housing which has an inlet and an outlet for the cooling medium.

Figure 4:
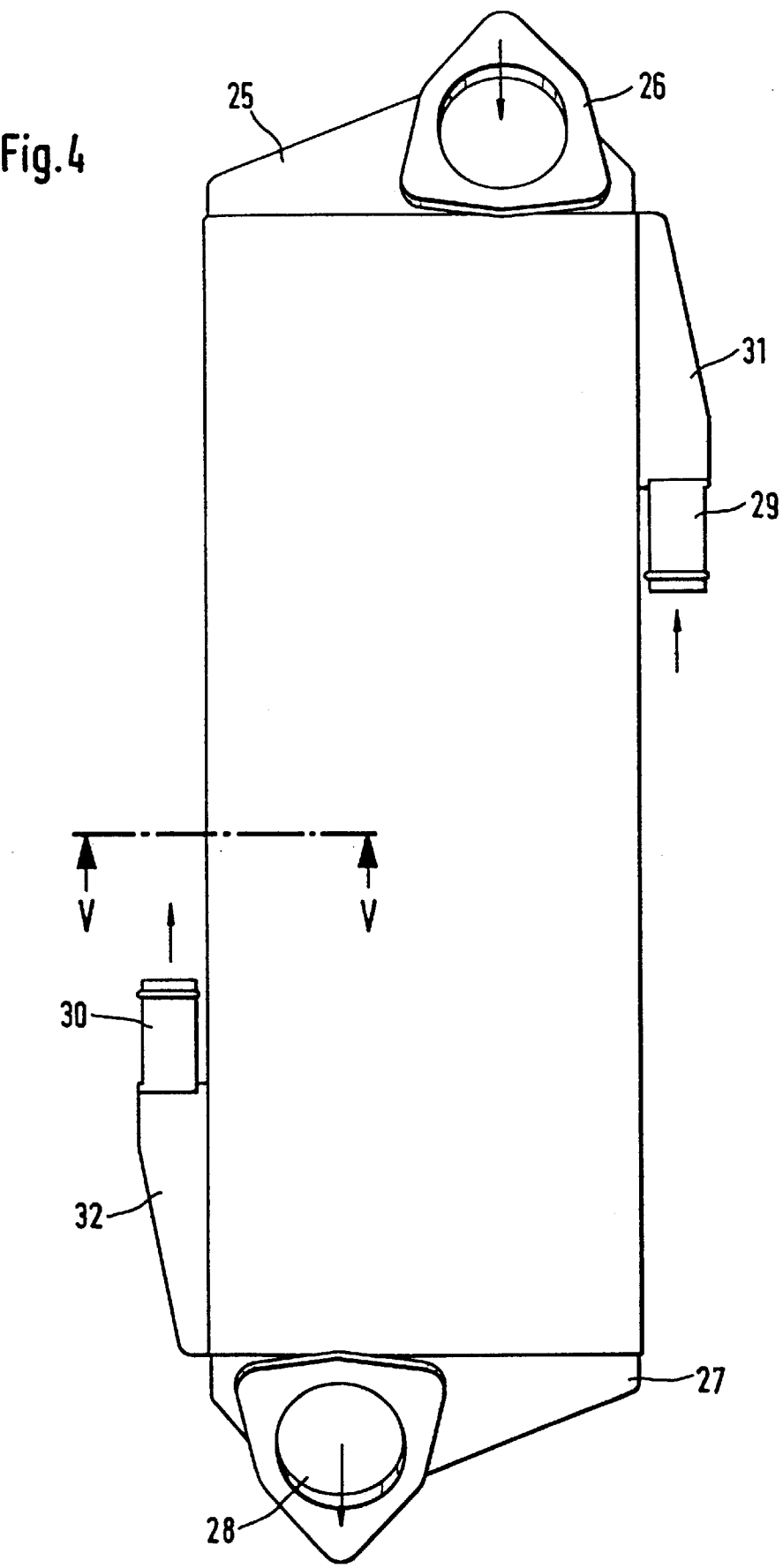
FIG. 4 is a top view of an exhaust gas heat exchanger cooled by a liquid coolant, particularly by internal-combustion engine coolant.

The heat exchanger for the cooling of exhaust gas illustrated in FIG. 4 has a parallelepiped-shaped elongated configuration. One face thereof is provided with a distributing box 25 which is equipped with a feeding connection 26 for an exhaust pipe. The opposite face has a collecting box 27 which is provided with a removing connection 28. The heat exchanger has a closed flow guiding system for the exhaust gas. In addition, the heat exchanger has a closed flow guiding system for a liquid coolant, particularly the cooling liquid of a pertaining internal-combustion engine. Respective opposite sides are provided with a connection 29 for feeding the liquid cooling medium and a connection 30 for removing the liquid cooling medium. The hose connection 29, which is situated in the area of the feeding connection 26, is provided with a distributing box 31 which extends along the whole height of the heat exchanger. Correspondingly, the hose connection 30, which is situated in the area of the outlet connection 28, is provided with a collecting box 32. The exhaust gas and the cooling medium flow into the heat exchanger as a parallel current.

Figure 5:
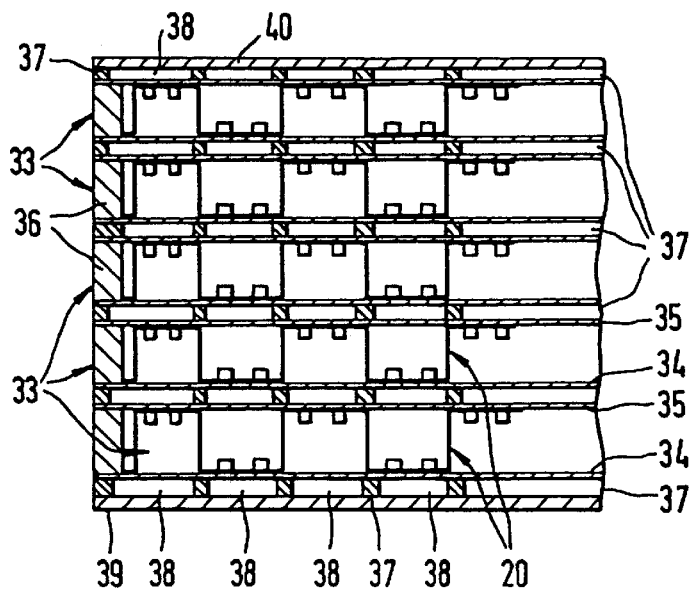
FIG. 5 is a partial sectional view along line V—V of FIG. 4.
Figure 7:
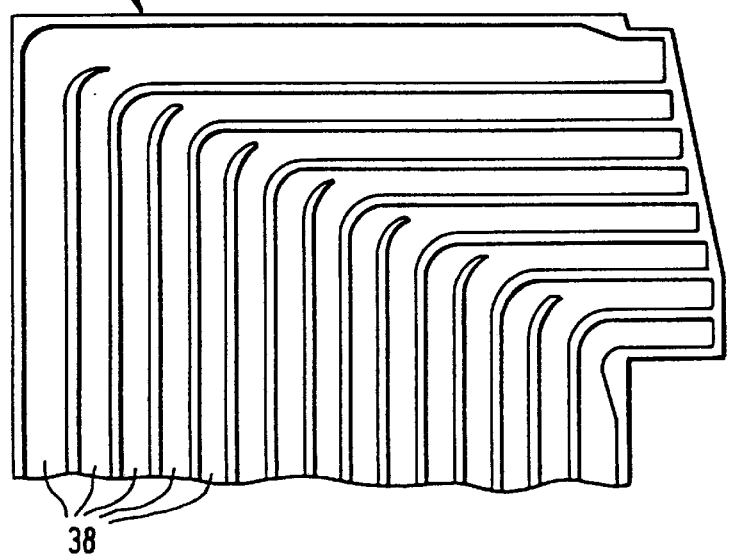
FIG. 7 is a top view of a cut-out of a plate of the heat exchanger according to FIG. 5 which is configured for guiding the coolant.

In FIG. 5, the heat exchanger has several disk-shaped heat exchange elements 33 which, on the faces thereof, are open toward the distributing box 25 and toward the collecting box 27. The disk-shaped heat exchange elements 33 are each joined together from two thin sheet metal plates 34, 35, between which shoulders 36 are arranged in the area of the lateral walls of the heat exchanger. Between the metal sheets 34, 35 of the adjacent heat exchange elements 33, one plate 37 respectively is arranged which is provided with parallel recesses 38 extending in the longitudinal direction, as also shown in FIG. 7. In the area of the frontal ends, the recesses are each bent toward the outside and project into the distributing box 31 and the collecting box 32 of the hose connections 29 or 30. The respective outermost heat exchange elements 33 are provided on the outside thereof with a plate 37 which are, in turn, covered by a cover plate 39, 40. Together with the metal sheets 34, 35 or with the outer cover plates 39, 40, the recesses 38 therefore form ducts which extend in the longitudinal direction of the heat exchanger and in which the liquid coolant is guided. The sheet metal plates 34, 35 may be provided with naps which are each placed on the adjacent sheet metal plate 34, 35.

Figure 6:
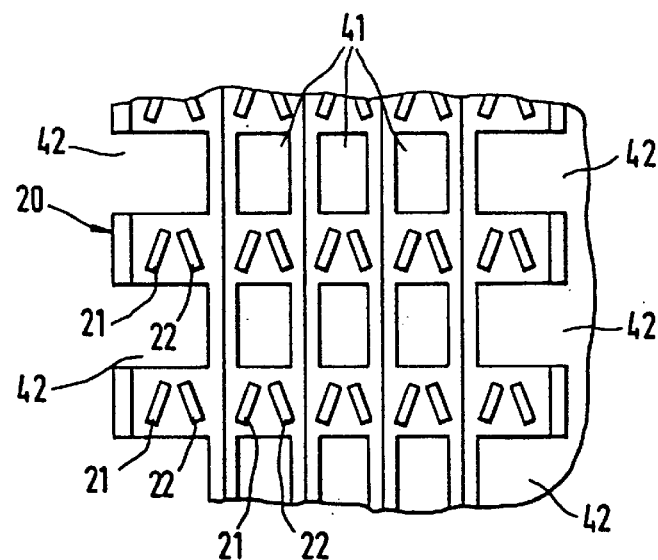
FIG. 6 is a top view of a cut-out of a turbulence insert.

In the disk-shaped heat exchange elements, turbulence inserts 20 are arranged which each consist of several sheet metal strips which are bent in a meandering shape and extend in the longitudinal direction of the heat exchange elements 33. A cut-out of a turbulence insert 20 of this type is illustrated in FIG. 6. The turbulence inserts 20 divide the heat exchange elements 33 into parallel ducts which extend from the distributing box 25 to the collecting box 27. The turbulence inserts 20 are provided with upward projections 21, 22 which are arranged in an approximately V-shaped manner with respect to one another, the V pointing against the flow direction of the exhaust gas. As illustrated in FIG. 5, the projections 21, 22 are set up such that they project from a surface resting against a metal sheet 34 or 35 toward the interior into the respective ducts. As shown in FIG. 6, the projections 21, 22 are each arranged in a row extending transversely with respect to the flow direction. Between these rows, the turbulence insert 20 is provided with recesses 41 in the surfaces facing the metal sheets 34, 35. These recesses 41 therefore do not influence the division into individual ducts which extend in the longitudinal direction because the sections of the turbulence insert 20 which connect the metal sheets 34, 35 remain closed. Only in the area of the two lateral edges, recesses 42 are provided which are also open toward the side are provided only in the area of the two lateral edges. That is, the recesses 42 interrupt the wall between the metal sheets 34 and 35 which is situated there. It is, therefore, possible to construct a turbulence insert 20 for a heat exchange element from several strips corresponding to FIG. 6 which are arranged side-by-side while being offset by a pitch and engage in one another in a toothing-like manner.

Because the exhaust gas of an internal-combustion engine, particularly the exhaust gas of a diesel engine, for which the exchanger according to the present invention is primarily intended, is relatively hot and aggressive, a material must be provided for all elements of the heat exchanger which withstands these aggressive conditions. A high-quality special steel is particularly suitable for this purpose.

The heat exchanger according to FIG. 4 is "packed" in the manner explained by reference to FIG. 5. Soldering foils, particularly made of a nickel-based solder, are arranged between the individual elements so that the entire heat exchanger can be soldered in a furnace in one operating cycle. In a modified embodiment, the heat exchanger can be of a welded construction.

The setting angle of the projections 21, 22 with respect to the flow direction is between 10° and 40°. Their mutual distance amounts to between 10 mm and 50 mm. The height of the projections amounts to between 1 mm and 3 mm in the case of a height of the ducts of the heat exchange elements 33 being between 3 mm and 10 mm. The duct width of the individual ducts is selected between 10 mm and 100 mm. With a larger duct width, it may be necessary to assign to each of these ducts several pairs of projections 21, 22 side-by-side. It has been found that a heat exchanger of such dimensions functions well and prevents a deposition of particles, particularly of soot particles, also over an extended period of time. It has also been found that, for a more effective cooling, a height of approximately 1.5 mm of the ducts formed by the recesses 38 and the metal sheets 34, 35 or the cover plates 39, 40 is sufficient for an effective cooling.

In a further modified embodiment, the projections 21, 22 each project upwards from the sections of the turbulence inserts 20 which bridge the duct height so that they can be arranged on both sides of each duct or, still further, the projections type can be arranged alternately on the top and on the bottom in each duct.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Heat exchanger for cooling exhaust gas of a motor vehicle engine with a closed flow guiding system for the exhaust gas, comprising at least one heat exchange element arranged between a feeding device and a removing device for the exhaust gas and around which a cooling medium flows, the at least one heat exchange element defining a plurality of separate fluid passages in the flow direction, and a single row of V-shaped pairs of projections being disposed at at least one wall of each said fluid passage.

2. Heat exchanger for cooling exhaust gas of a vehicle internal-combustion engine (gas), comprising at least one heat exchange element extending in a flow direction from an exhaust gas inlet to an exhaust gas outlet to form a flow duct for the exhaust gas, and means for providing a cooling medium flow outside and around the flow duct, wherein the at least one heat exchange element defines a plurality of separate fluid passages in the flow direction, and a single row of V-shaped pairs of projections is disposed at at least one wall of each said fluid passage.

3. Heat exchanger according to claim 2, wherein the projections of each said pair extend in opposite directions diagonally with respect to the flow direction.

4. Heat exchanger according to claim 3, wherein the projections of each said pair diverge in the flow direction.

5. Heat exchanger according to claim 2, wherein the projections are aligned at angles of between 15° and 40° diagonally with respect to the flow direction.

6. Heat exchanger according to claim 2, wherein a turbulence insert is arranged in the flow duct and comprises a metal sheet bent transversely to the flow direction in a meandering shape and divides the flow duct into a plurality of channels extending in the flow direction.

7. Heat exchanger according to claim 6, wherein the projections each project upwards from a surface resting against one of the metal sheets of the heat exchange element.

8. Heat exchanger according to claim 2, wherein the at least one heat exchange element is a plurality of heat exchange elements provided with one of corrugated ribs and solid ribs arranged between adjacent ones of the heat exchange elements.

9. Heat exchanger according to claim 2, wherein the at least one heat exchange element has two parallel metal sheets with edges spaced by shoulders and configured to receive therebetween a turbulence insert.

10. Heat exchanger according to claim 9, wherein the at least one heat exchange element is a plurality of heat exchange elements having one plate arranged between adjacent ones of the heat exchange elements, which plate is provided with strip-shaped recesses which extend essentially parallel to one another and which form, together with the metal sheets of the heat exchange elements, the means for providing the cooling medium flow.

11. Heat exchanger according to claim 2, wherein adjacent rows of said pairs of the projections are arranged on opposite walls of the flow duct.

12. Heat exchanger for cooling exhaust gas of a motor vehicle engine with a closed flow guiding system for the exhaust gas comprising at least one heat exchange element arranged between a feeding device and a removing device for the exhaust gas and around which a cooling medium flows, the at least one heat exchange element having a flow duct for the exhaust gas in which at least one turbulence insert is operatively arranged with projections from a surface which extend diagonally with respect to a flow direction, wherein interim areas of the turbulence insert are provided with a series of alternating projections and recesses.

13. Heat exchanger according to claim 12, wherein adjacent pairs of the projections are arranged on opposite walls of the flow duct.

14. A heat exchange method for cooling exhaust gas of a motor vehicle, comprising the steps of (a) arranging at least one heat exchange element between a feeding device and a removing device of a closed flow guiding system around which a cooling medium flows such that the heat exchange element has a flow duct with at least one turbulence insert operatively arranged and defined by projections from a surface of the heat exchange element, which projections extend diagonally with respect to a flow direction of the exhaust gas from an engine of the motor vehicle;

(b) providing recesses in areas of the at least one heating element, which recesses are offset with respect to the projections in the flow direction; and (c) flowing the exhaust gas from the engine through the heat exchange element such that boundary layers of the exhaust gas are constantly broken up and the exhaust gas is constantly mixed and cooled while passing through the heat exchange element.

15. Heat exchanger for cooling exhaust gas of a vehicle internal-combustion engine, comprising at least one heat exchange element extending in a flow direction from an exhaust gas inlet to an exhaust gas outlet to form a flow duct for the exhaust gas, means for providing a cooling medium flow outside and around the flow duct, and V-shaped pairs of projections extending along the flow direction to form a row in the flow duct wherein the projections of each V-shaped pair diverge in the flow direction, the flow duct has side walls defining at least one fluid passage, and each said side wall forms a converging path with a respective leg of the V-shaped pairs.

* * * * *